H. C. TANABE.
HOG TRAP.
APPLICATION FILED MAR. 2, 1912.

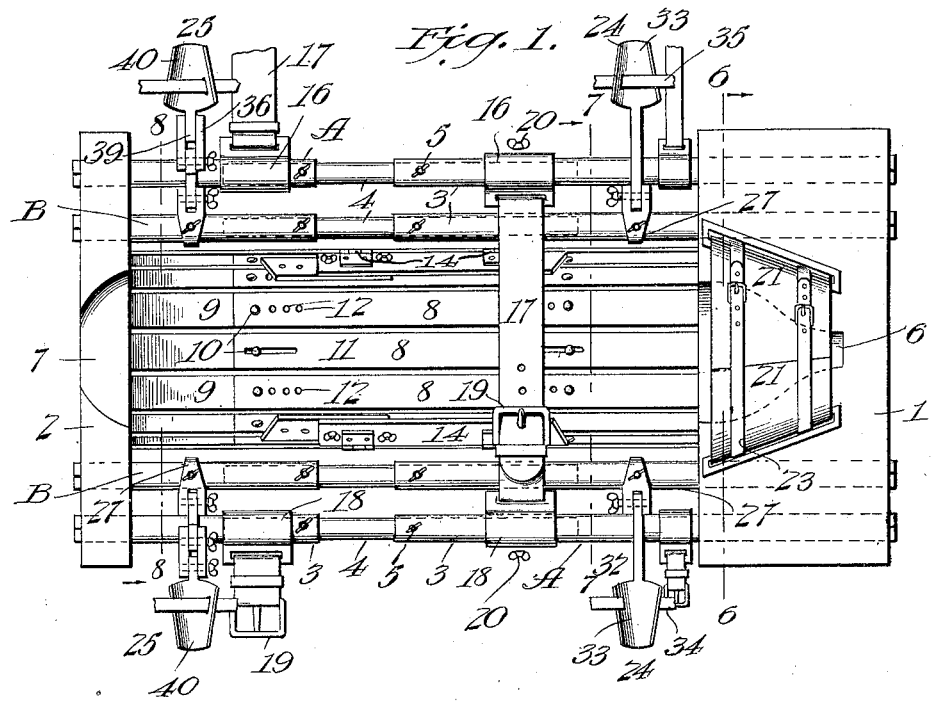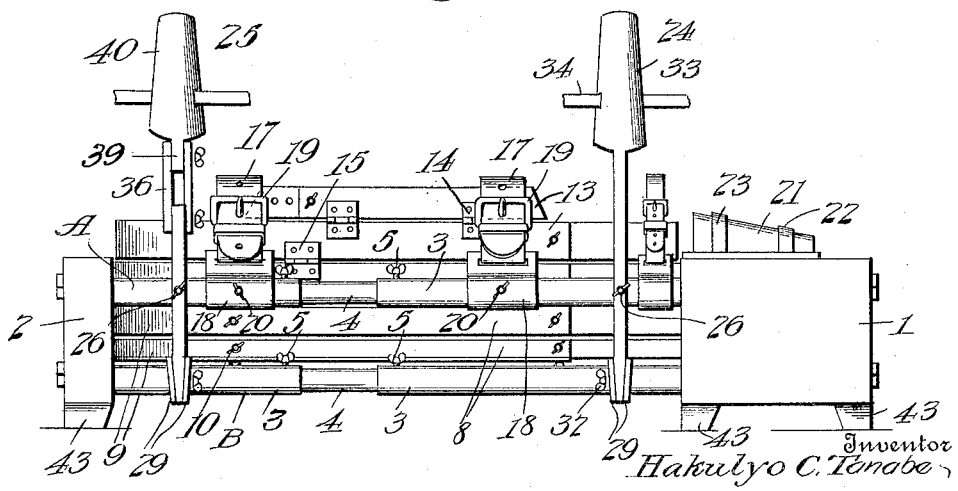

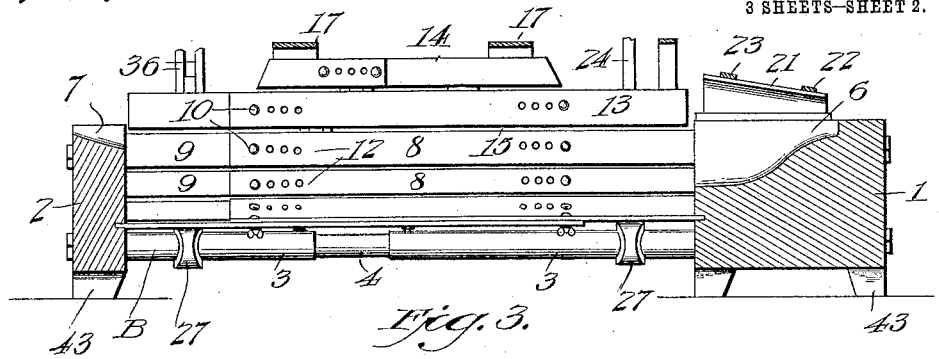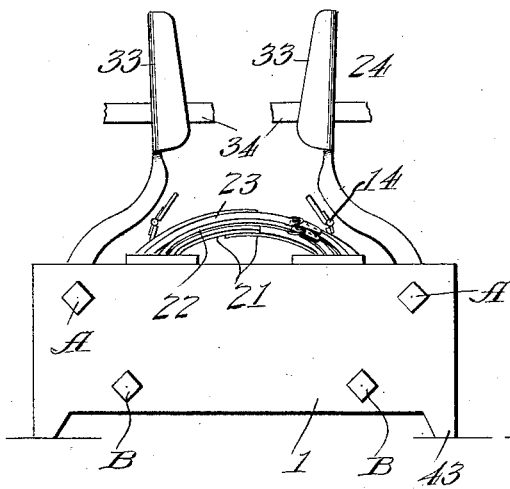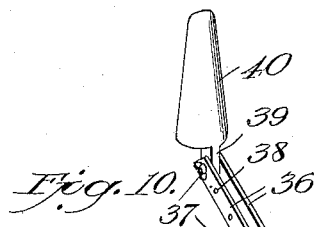

1,055,953.

Patented Mar. 11, 1913.

3 SHEETS—SHEET 3.

Witnesses

Inventor
Hakulyo C. Tanabe
By Victor J. Evans
Attorney

COLUMBIA PLANOGRAPH CO., WASHINGTON, D. C.

UNITED STATES PATENT OFFICE.

HAKULYO CHUHACHI TANABE, OF MARYSVILLE, CALIFORNIA.

HOG-TRAP.

1,055,953. Specification of Letters Patent. Patented Mar. 11, 1913.

Application filed March 2, 1912. Serial No. 681,143.

*To all whom it may concern:*

Be it known that I, HAKULYO CHUHACHI TANABE, a citizen of Japan, residing at Marysville, in the county of Yuba and State of California, have invented new and useful Improvements in Hog-Traps, of which the following is a specification.

This invention relates to that class of devices which are sometimes known as hog traps and which are used for holding hogs and other animals, such as sheep, for castration and other operations.

The invention has for its object to produce a device of this class of simple and improved construction which may be readily extended so as to fit animals of different sizes.

A further object of the invention is to provide a device of simple and improved construction whereby the animal will be held with absolute security while being operated upon, the limbs especially being securely retained and held in any convenient position to which they may be adjusted.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

Figure 6:
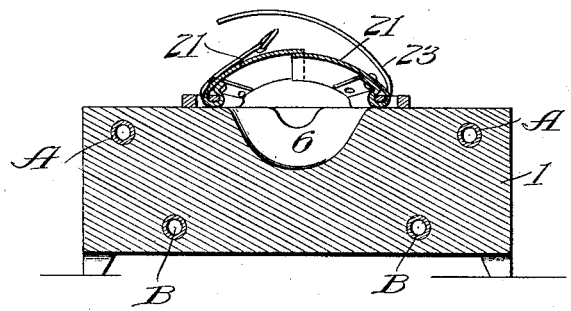
Figure 7:
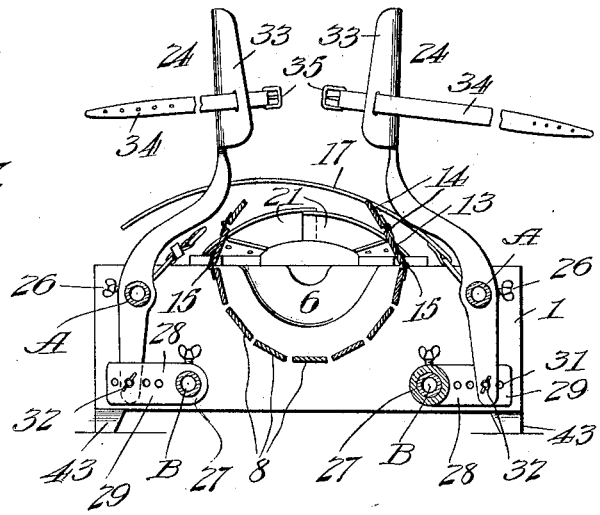
Figure 8:
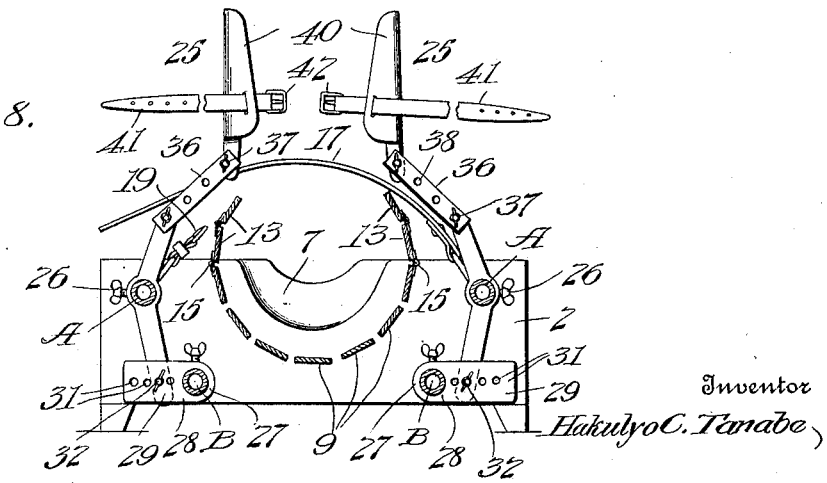

In the drawings,—Figure 1 is a top plan view of a device constructed in accordance with the invention. Fig. 2 is a side elevation of the same. Fig. 3 is a longitudinal vertical sectional view. Figs. 4 and 5 are end views of the machine as seen from opposite ends. Fig. 6 is a transverse sectional view taken on the line 6—6 in Fig. 1. Fig. 7 is a transverse sectional view taken on the line 7—7 in Fig. 1. Fig. 8 is a transverse sectional view taken on the line 8—8 in Fig. 1. Fig. 9 is a perspective detail view of one of the front leg holders. Fig. 10 is a perspective detail view of one of the rear leg holders.

Corresponding parts in the several figures are denoted by like characters of reference.

In the construction of the improved device there is employed a head block 1 and a foot block 2, said head and foot blocks being connected together adjacent to their upper corners by brace members A, and said blocks being also connected together near their lower edges by brace members B, which latter are spaced some distance away from the corners. The brace members A and B are of telescope construction, each being shown as including tubular members 3 connected with the head and foot blocks, and rods 4 telescoping in said tubular members, set screws 5 being provided to retain the parts in adjusted position.

The head block 1 is provided with a cavity 6 to accommodate the head of the animal, and a corresponding cavity 7 is formed in the foot block 2. Suitably connected with the block 1 are bed strips 8 which overlap similar bed strips 9 that are secured upon or connected with the foot block, said bed strips 8 and 9 being adjustably connected by bolts 10 engaging slots 11 or apertures 12 therein, the slots being preferred in order to avoid changing the bolts from one aperture to another in making adjustment as to the length of the device. The bed strips 8 and 9 are connected with the head and the foot block in such fashion that they will form a bed or cradle of suitable shape to accommodate the back of the animal when placed therein. The bed or cradle is provided with flexible extensions each composed of a plurality of strips 13 connected together by hinges 14, the innermost extension strips 13 being connected with the outermost bed strips by means of hinges 15. The extension strips 13 may be constructed each of two adjustably connected overlapping members, and each of the flexible extensions may be composed of two or more extension strips.

Slidably mounted on the brace members A are collars, some of which, 16, at one side of the machine carry belt straps or billets 17, while others of said collars, 18, at the other side of the machine carry buckles 19 with which the straps or billets 17 may be connected, after being passed across the belly of the animal which is supported in the bed or cradle. The collars 16 and 18 are provided with set screws 20 whereby they may be secured in adjusted position.

Suitably secured upon the head block 1 adjacent to the sides of the cavity 6 are flaps 21 of leather or other suitable material, combining to form a mask to engage the head of the animal, straps and buckles 22, 23 being also provided and suitably connected with the bed block to extend across the flaps constituting the mask for the purpose of securing and holding the head of the animal firmly and without liability of injury.

Slidably mounted on the brace members A are the front and rear limb holders 24 and 25 which are equipped with set screws 26 whereby they may be secured in adjusted position. Slidably associated with the brace members B are collars 27 having outwardly extending arms 28 provided with upstanding flanges 29 between which the lower ends of the limb holders 24 and 25 are inserted, the lower ends of said limb holders being provided with apertures 30, and the flanges 29 being provided with rows of apertures 31 for the passage of a pin, bolt or screw 32, whereby the lower ends of the limb holders may be adjustably connected with the outwardly extending arms, thus permitting the upper ends of the limb holders, when the fastening members 32 are detached, to be rocked or moved to any desired position where they may be secured by replacing the fastening members 32.

The front limb holders 24 are provided at their upper ends with curved plates or splints 33 to accommodate the front limbs of the animal, straps 34 having terminal buckles 35 being suitably connected with said splints and adapted to be wound around the limb of the animal to firmly secure the same. The rear limb holders 25 are provided at their upper ends with links 36 adjustably connected therewith by means of pivot members 37 adapted to engage any one of a plurality of apertures 38 in said links. Pivotally connected with the outer ends of the links are extension members 39 carrying curved plates or splints 40 with which straps 41 having buckles 42 are suitably connected for the purpose of firmly securing the hind limbs of the animal.

The head and foot blocks have been shown as being equipped with feet or supports 43 whereby they are raised above the ground.

From the foregoing description, taken in connection with the drawings hereto annexed, the operation and advantages of this invention will be readily understood by those skilled in the art to which it appertains. The animal to be operated upon is placed on its back in the bed or cradle, the flexible extensions of which will protect the body of the animal from injury by the fastening straps 17 which may be buckled as tightly as may be desired. The head of the animal is held by the mask flaps 21 and straps 22, and the front and rear limbs are securely strapped upon the splints of the limb holders. When the animal is thus secured, the operator may proceed at his leisure, and any operation may be performed with a much greater degree of celerity and safety than is possible with appliances now customarily employed. The construction of the device is simple, and the animal may be very quickly secured and released.

Having thus described the invention, what is claimed as new, is:—

1. In a device of the character described, an extension cradle comprising head and foot blocks, overlapping strips connected therewith and adjustably secured together, and telescopic top and bottom braces, flexible side extensions hingedly connected with the outermost bed strips, collars slidably engaging the top braces and buckles, and billets associated with said collars.

2. In a device of the character described, a head block having a cavity, mask flaps secured adjacent to the side edges of said cavity, and straps associated with the block to extend across the mask flaps.

3. In a device of the character described, a bed or cradle comprising a head block, a foot block, overlapping bed strips associated therewith, means for adjustably connecting the overlapping bed strips, top braces connecting the blocks near the upper corners thereof, and bottom braces connecting the blocks near the lower edges thereof, collars slidably engaging the top braces, buckles and billets associated with said collars, limb holders slidably engaging the top braces and extending upwardly and downwardly therefrom, collars slidably engaging the bottom braces and having outwardly extending arms, and means for adjustably connecting the lower ends of the limb holders with said arms.

4. In a device of the character described, a bed or cradle including head and foot blocks and top and bottom braces connecting the same, limb holders longitudinally slidable upon the top braces and extending upwardly and downwardly therefrom, said limb holders being provided with means to secure them against sliding movement, means associated with the bottom braces to adjustably engage the downwardly extending ends of the limb holders, thereby retaining the latter against tilting movement, and body securing means associated with the top braces.

5. In a device of the character described, a bed or cradle including head and foot blocks and telescoping top and bottom braces adjustably connecting the same, limb holders longitudinally slidable upon the top braces and having upwardly and downwardly extending ends, said limb holders being provided with means whereby they may be secured against sliding movement, means associated with the bottom braces to engage the downwardly extending ends of the limb holders, thereby securing the same against tilting movement, limb receiving splints associated with the limb holders, and fastening straps associated with the splints.

6. In a device of the character described, a bed or cradle including head and foot blocks and top and bottom braces connecting the same, limb holders slidably and adjustably engaging the top braces, collars slidably engaging the bottom braces and having outwardly extending arms provided with apertured flanges, and connecting members engaging the apertured flanges through the lower ends of the limb holders.

7. In a device of the character described, a bed or cradle including head and foot blocks and top and bottom braces connecting the same, limb holders slidably and tiltably engaging the top braces, means associated with the bottom braces and engaging the lower ends of the limb holders to retain the latter in adjusted position, links adjustably connected with the upper ends of the limb holders, and extension members connected with said links and having limb receiving splints and fastening means associated therewith.

In testimony whereof I affix my signature in presence of two witnesses.

HAKULYO CHUHACHI TANABE.

Witnesses:
 THOS. F. BRESNAN,
 ED. L. BORDWELL.

Copies of this patent may be obtained for five cents each, by addressing the "Commissioner of Patents, Washington, D. C."